Aug. 10, 1954 R. M. MAGNUSON ET AL 2,685,771

VEGETABLE BUNCHING AND WRAPPING APPARATUS

Filed April 26, 1949 8 Sheets-Sheet 1

INVENTORS
MILTON D. DONOVAN
ROY M. MAGNUSON

BY Harper Allen

ATTORNEY

INVENTORS
MILTON D. DONOVAN
ROY M. MAGNUSON
BY Harper Allen
ATTORNEY

Aug. 10, 1954 R. M. MAGNUSON ET AL 2,685,771

VEGETABLE BUNCHING AND WRAPPING APPARATUS

Filed April 26, 1949 8 Sheets-Sheet 3

INVENTORS
MILTON D. DONOVAN
ROY M. MAGNUSON

BY Harper Allen
ATTORNEY

Aug. 10, 1954 R. M. MAGNUSON ET AL 2,685,771

VEGETABLE BUNCHING AND WRAPPING APPARATUS

Filed April 26, 1949 8 Sheets-Sheet 4

INVENTORS
MILTON D. DONOVAN
ROY M. MAGNUSON

BY Harper Allen
ATTORNEY

Aug. 10, 1954 R. M. MAGNUSON ET AL 2,685,771

VEGETABLE BUNCHING AND WRAPPING APPARATUS

Filed April 26, 1949 8 Sheets-Sheet 5

INVENTORS
MILTON D. DONOVAN
ROY M. MAGNUSON
BY Harper Allen
ATTORNEY

INVENTORS
MILTON D. DONOVAN
ROY M. MAGNUSON
BY Harper Allen
ATTORNEY

VEGETABLE BUNCHING AND WRAPPING APPARATUS

Filed April 26, 1949 8 Sheets-Sheet 7

INVENTORS
MILTON D. DONOVAN
ROY M. MAGNUSON
BY
Harper Allen
ATTORNEY

VEGETABLE BUNCHING AND WRAPPING APPARATUS

Filed April 26, 1949 8 Sheets-Sheet 8

INVENTORS
MILTON D. DONOVAN
ROY M. MAGNUSON
BY
Harper Allen
ATTORNEY

Patented Aug. 10, 1954 2,685,771

UNITED STATES PATENT OFFICE 2,685,771

VEGETABLE BUNCHING AND WRAPPING APPARATUS

Roy M. Magnuson, Campbell, and Milton D. Donovan, Los Gatos, Calif., assignors, by direct and mesne assignments, to Stephen D'Arrigo Application April 26, 1949, Serial No. 89,584

18 Claims. (Cl. 53—98)

The present invention relates to the packing of vegetables such as broccoli and is concerned with the provision of equipment for bunching the broccoli and for applying a wrap or tie to each individual bunch in an automatic fashion.

Bunching and wrapping apparatus of the character disclosed herein presents problems because of the irregular shape of the product by itself and in a bunch, and because it is usually packed while wet. In commercial practice, it has been customary to employ hand wrapping.

Accordingly, the general object of the invention is to provide automatic bunching and wrapping equipment whereby a succession of bunches of broccoli or similar vegetable articles can be carried through the equipment and have a wrap applied thereto in a secure fashion. It is preferred to apply a wrap or tie in the form of a heat sealing tape so that the securing of the wrap in place can be effected by heat sealing operation.

Other objects and advantages of the invention will be apparent from the following description of a preferred embodiment thereof as illustrated in the accompanying drawings, in which:

Figure 1 is a schematic plan view of the apparatus.

Figure 2, compised of sections 2a, 2b and 2c, is an enlarged plan view of the active end of the wrapping unit of the apparatus.

Figure 12 is a vertical sectional view of the wrap or tape feed mechanism taken as indicated by the line 12—12 in Figure 2a.

Figure 14 is a vertical sectional view of the tape feed mechanism taken as indicated by the line 14—14 in Figure 2a.

Figure 1:
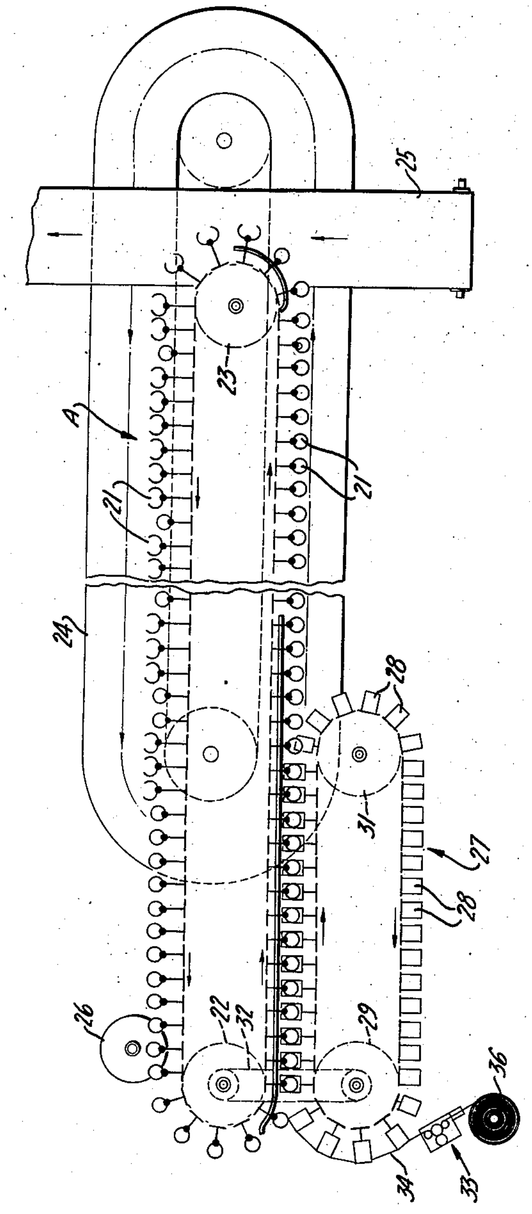

Referring to Figure 1, there is shown schematically apparatus embodying the invention including a broccoli bunching unit of the general type disclosed and claimed in the copending application of Roy M. Magnuson and Ralph K. Daugherty, Serial No. 47,856, filed September 4, 1948, for Vegetable Packing Method and Apparatus. This bunching unit includes an endless series of pockets 21 carried by suitable conveyor chains trained about a drive sprocket 22 and an idler sprocket 23 above a circulating conveyor 24 on which the broccoli to be bunched is placed. The path of travel of the bunching pockets 21 as indicated in Figure 1 is generally counterclockwise and they pass in open position through a feeding area indicated at A. At this feeding area or station, the proper amount of broccoli is placed in each pocket by operators so that the pockets are forced inwardly and grasp the bunch firmly and compact it. The bunches in the pockets 21 are then carried past a butt trimming saw 26, as disclosed in said application, and thereafter the trimmed bunches are carried into operative relation with respect to the wrapping unit 27 which comprises an endless series of wrapping pockets 28 carried by an endless conveyor trained about a drive sprocket 29 and an idler sprocket 31, the drive being transmitted to the sprocket 29 by means of a suitable chain and sprocket drive connection 32 from the drive or the sprocket 22 of the bunching unit. In this way the bunching and wrapping units are driven in timed relation to each other.

The arrangement of the bunching unit with respect to the wrapping unit is such that the pockets 21 and 28 along their adjacent stretches travel in vertically overlapped aligned relation and at the same rate of speed. As later described, as the wrapping units travel in a generally clockwise direction as indicated in Figure 1, they engage a strip or tape of suitable heat sealing material such as moisture proof "Cellophane" or coated paper from a tape feed unit 33 described later in detail. The feed unit 33 is operated in conjunction with the wrapping pockets 28 to perforate the strip 34 from the supply roll 36 in timed relation to the progress of the pockets and to their relative separation in travelling around the sprocket 29 so that the perforations are spaced apart corresponding to the desired length of wrap for each bunch of broccoli.

*Broccoli wrapping unit*

Figure 2A:
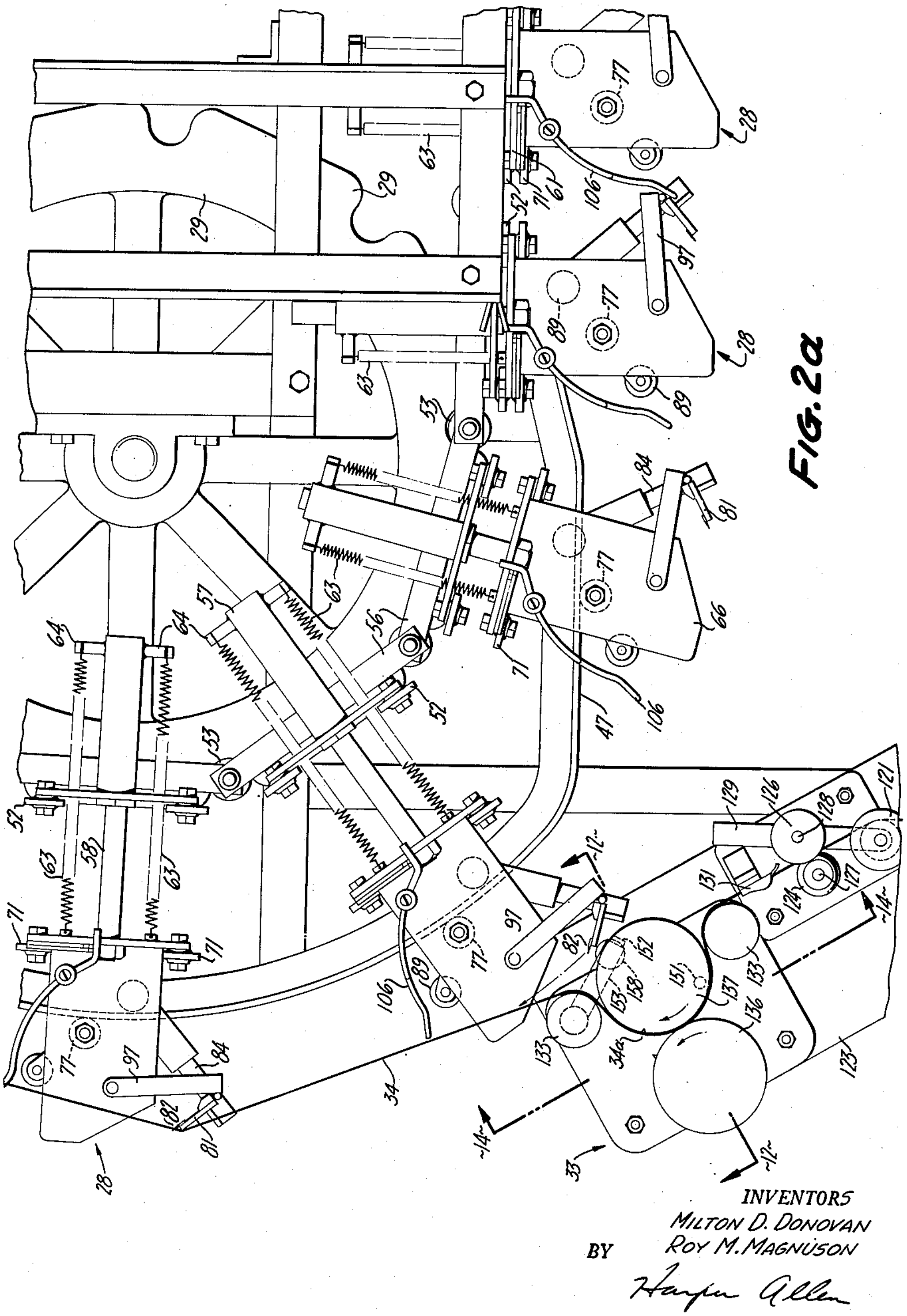
Figure 2B:
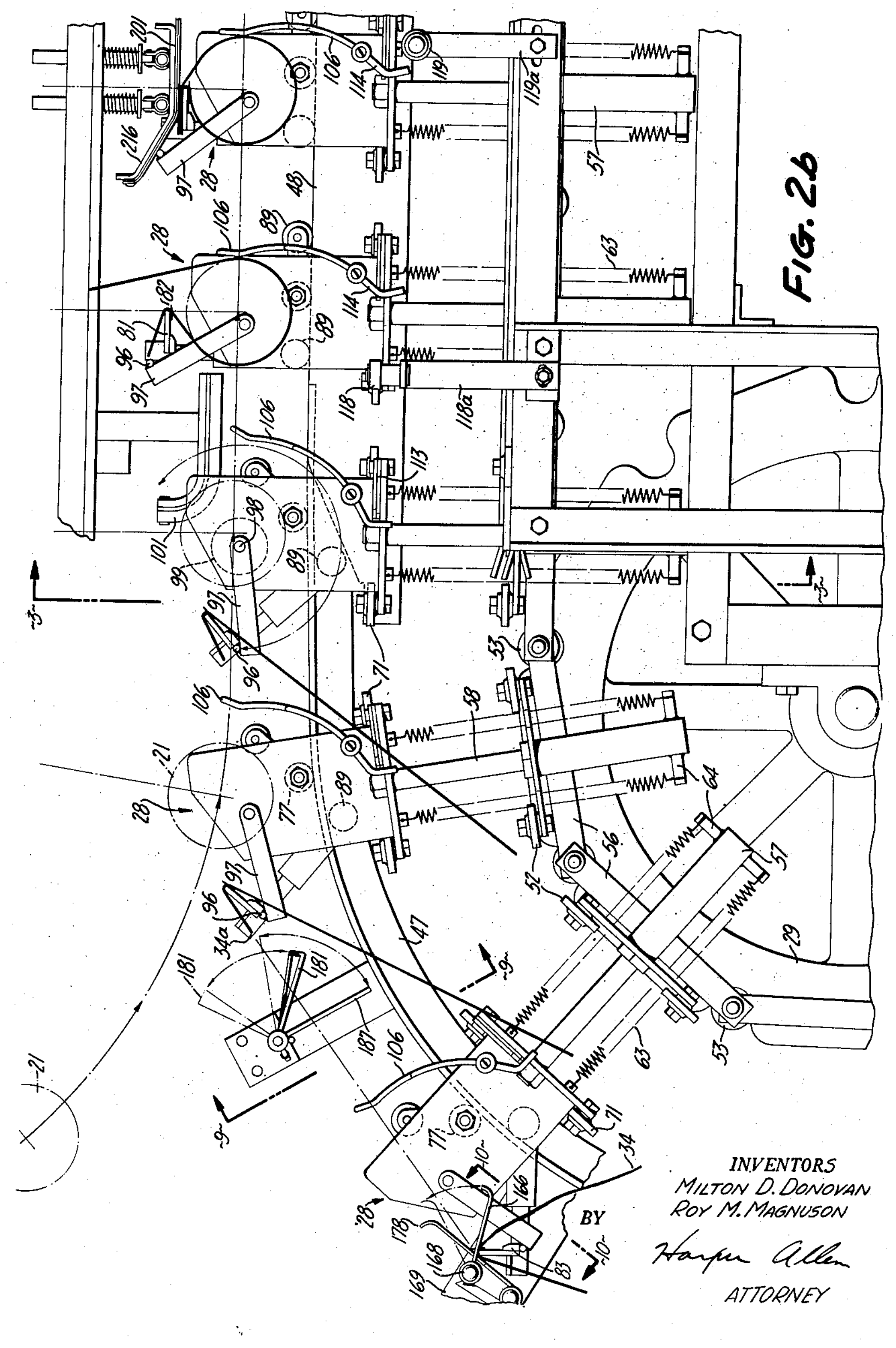
Figure 2C:
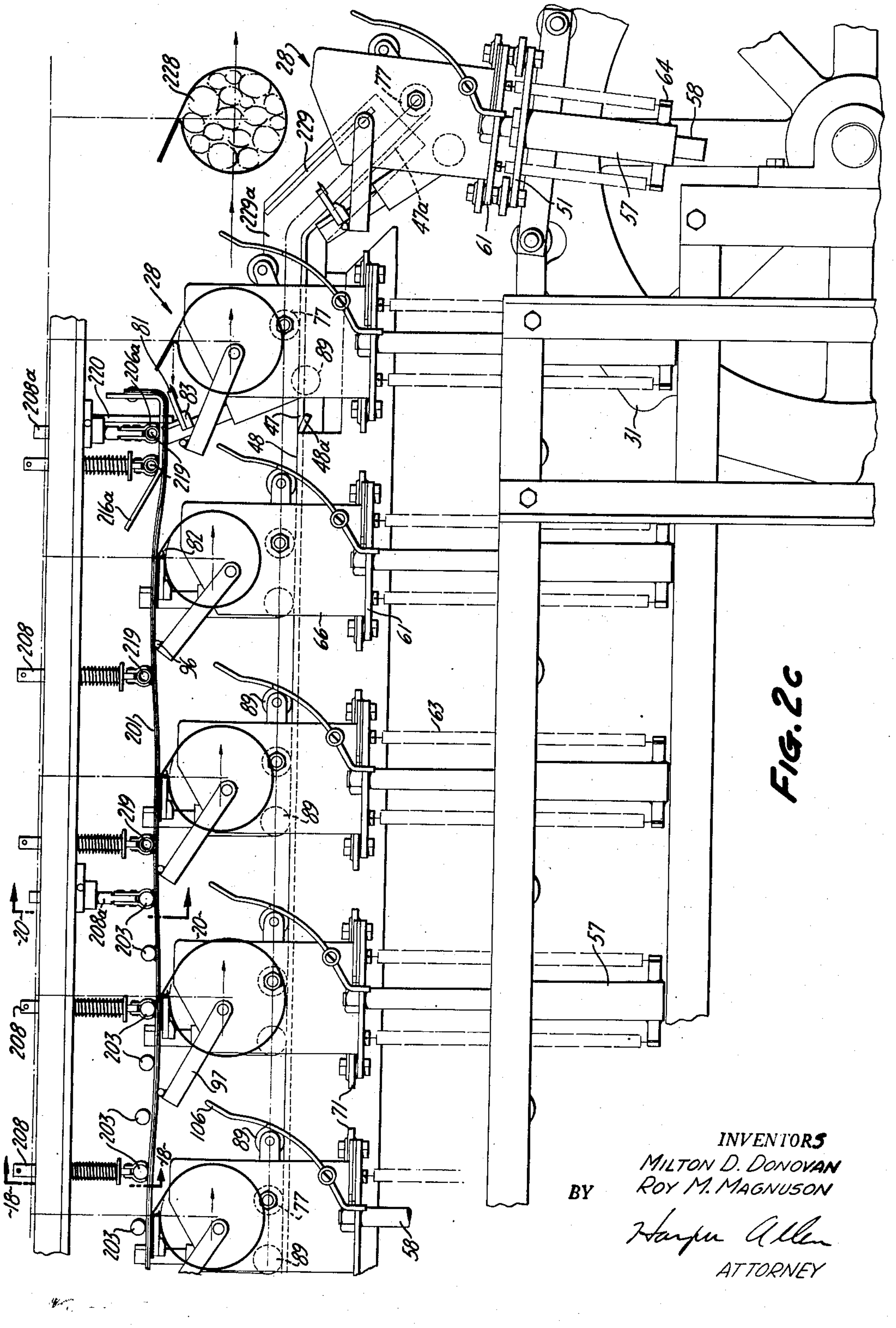
Figure 3:
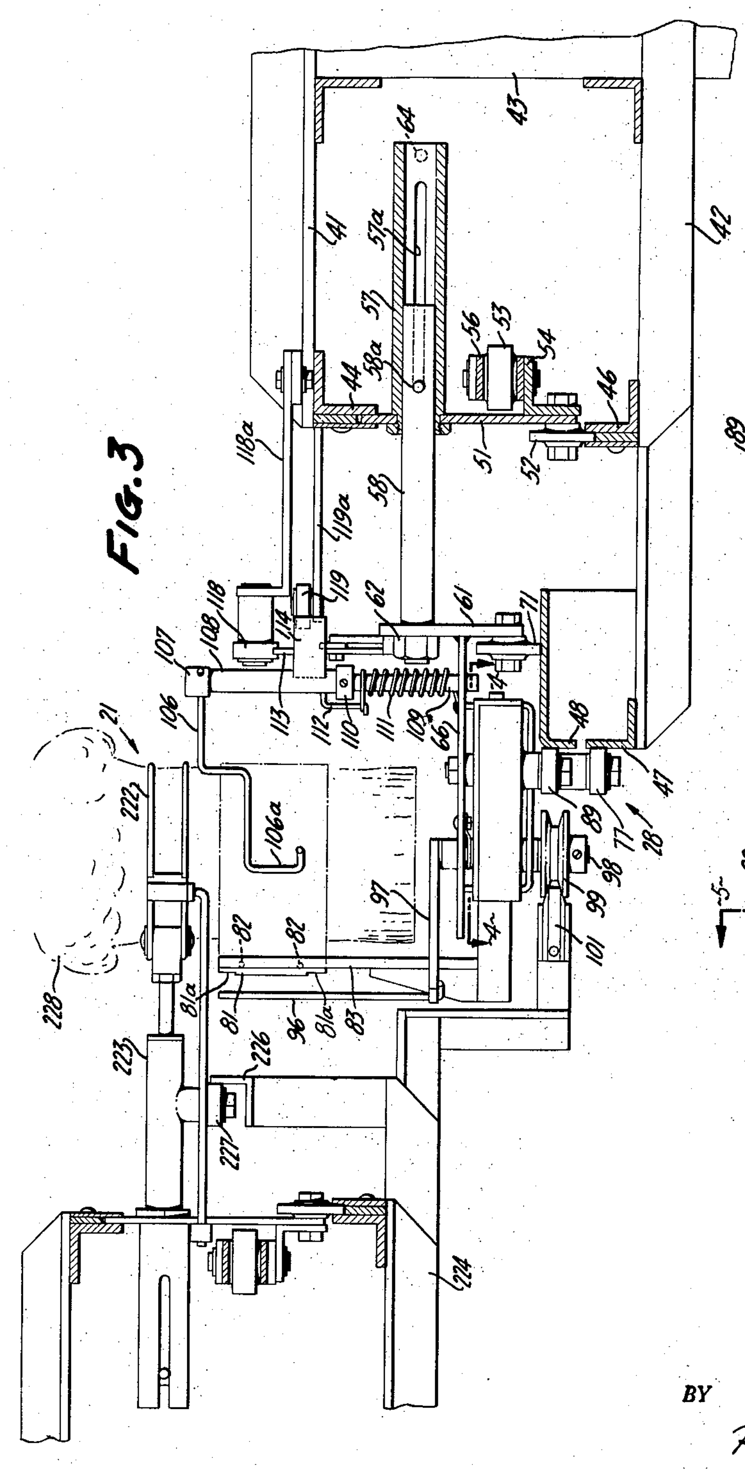
Figure 3 is a vertical sectional view taken as indicated by the line 3—3 in Figure 2b.

In Figures 2*a* to 2*c* and 3, the bunch wrapping unit comprises a suitable frame of structural material including an upper series of transverse angles 41 and a lower series of transverse angles 42. Each of the upper and lower series of transverse angles 41 and 42 is suitably supported on vertical frame pieces 43 and provide supports for respective upper and lower tracks 44 and 46 along the straight stretches of travel of the wrapping pockets as seen more clearly in Figure 3. Certain of the lower angles 42 are extended, as seen in Figure 3, to provide support for a cam track 47 for controlling the pocket position, as later described, and a cam track 48 operative in conjunction with pickup of the wrapping material, also as later described.

Each wrapping pocket or element comprises a support plate 51 (Figures 3 and 6) which is engaged within the track 44 at its lower edge and carries spaced rollers 52 for engagement with the lower track 46. It will be understood that the tracks 44 and 46 are coincident with the straight stretches of the wrapping unit, one of which coincides with the adjacent stretch of the bunching unit as shown in Figure 1 and do not extend otherwise around the machine. Each plate 51 (Figure 3) also carries a support bracket 54, to which is secured one side of a link of a conveyor chain 56 (Figures 2*a* and 3). Rollers 53 are provided on the chain 56 for engagement with the drive sprocket 29 and the idler sprocket 23 for progression in timed relation of the wrapping pockets as they travel through their path.

The carrier plate 51 is apertured to receive a support tube 57 (Figures 2*a*, 3 and 6) which receives telescopically a support rod 58 having opposite pins 58*a* engaged with longitudinal slots 57*a* in the support tube 57.

At its outer end the support rod 58 (Figures 3, 6 and 7) carries a vertical frame plate 61 of the wrapping unit secured thereon by a nut 62. A pair of springs 63 extend between the respective sides of the plate 61 and pins 64 adjacent the rear of the tube 57. The springs 63 tend to collapse the plate 61 toward the plate 51 for a purpose later described.

Secured to the plate 61 by welding is a horizontal frame plate 66 having a depending U-shaped bracket 68 secured thereto. A vertical bracing strip 67 is welded or otherwise secured between the plates 61, 66 and the bracket 68. The plate 61 (Figures 3, 6 and 7) carries a pair of spaced rollers 71 for engagement with the horizontal flange of the L-shaped cam track 48 to maintain the frame plate 66 in a horizontal position during its travel through the wrapping path in which the pockets 28 and 21 are overlapped.

Figure 5:
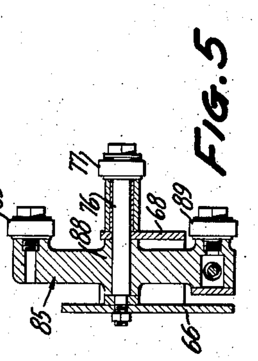
Figure 5 is a sectional view taken as indicated by the line 5—5 in Figure 4.
Figure 8:
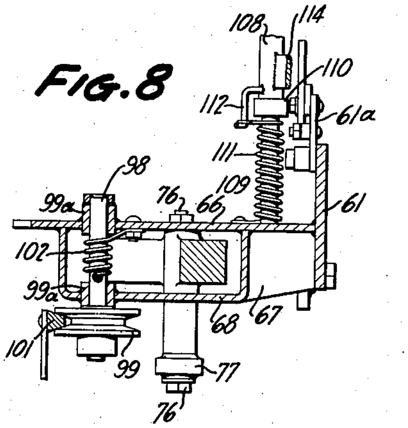
Figure 8 is a vertical sectional view taken as indicated by the line 8—8 in Figure 6.

In order to control the contracted and expanded condition of the wrapping pockets 28, the horizontal frame plate 66 of each pocket (Figures 5 and 8) has secured therein a vertical stud 76 which extends through the bracket 68 and on which a roller 77 is journalled for engagement with the cam track 47. As seen at the right-hand portion of Figure 2*a*, the pocket units 28 are collapsed, that is, the plates 51 and 61 are adjacent to each other, being held in this position by the springs 63. As the roller 77 of a pocket engages the track 47, seen at the third unit from the left in Figure 2*a*, the cam track 47 expands the wrapping unit to the position of the unit second from the left in Figure 2*a* to bring it into cooperative relation with the paper or wrapping strip 34.

Figure 4:
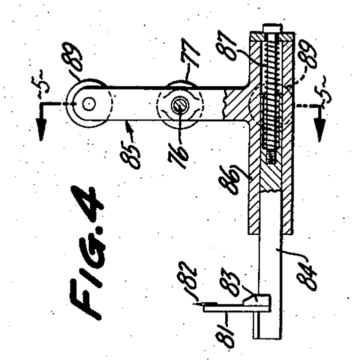
Figure 4 is a sectional view taken as indicated by the line 4—4 in Figure 3.

Each pocket contains a paper pickup and holding mechanism in the form of a vertical plate 81 (Figures 3, 4 and 6) carrying a pair of paper impaling pins or spikes 82. The plate 81 is supported by an upright bar 83 on a horizontal rectangular support rod 84. As seen in Figure 3, the pickup plate 81 is provided with offset notches 81*a* at its upper and lower portions for a purpose later described. The support bar 84 (Figure 4) is slidably mounted in a tube portion 86 of a T-shaped mounting lever 85, being yieldably held in extended position thereto by a spring 87 housed within the tube portion 86. The T-shaped support lever 85 is pivoted by means of a boss 88 on the rod 76. The support lever 85 carries respective rollers 89 (Figures 4, 5 and 6) for engagement with the vertical flange of the L-shaped cam 48, as seen in Figure 3, and to thereby control the path of travel of the paper pickup and sealing support plate 81.

The purpose of the yieldable support of this plate 81 by means of the spring 87 is for the purpose of allowing the path of travel of these various plates 81 along the wrapping and heat sealing path to vary in accordance with the size of the bundle of broccoli with which they are associated. This will be apparent from the later description of the operation of the apparatus.

Each wrapping pocket also includes a strip wrapping bar 96 (Figures 3 and 6) which is carried in upright position at the end of a support arm 97. The arm 97 (Figures 6 and 8) is journalled by a shaft 98 in spaced bosses 99*a* on the plate 66 and bracket 68, respectively. At its lower end the shaft 98 carries a V-pulley 99 for engagement with a stationary stretch of V-belt 101 (Figures 3 and 2*b*). The shaft 98, arm 97 and rod 96 are spring-urged clockwise, as viewed in Figure 6, by a spring 102 to contact the arm 97 with the vertical support 83 for the pickup plate 81. If desired, a suitable stop pin may be provided on the plate 66 for the arm 97. During the travel of a wrapping pocket past the belt 101, the wrap bar or rod 96 will be carried counterclockwise, as viewed in Figure 6, from the position thereof shown in full lines to the position thereof shown in dotted lines. As will be described more fully hereinafter, this serves to carry the strip of wrapping material or tape around the bunch of broccoli after it has been picked up by the support plate 81 and its impaling pins 82.

Figure 6:
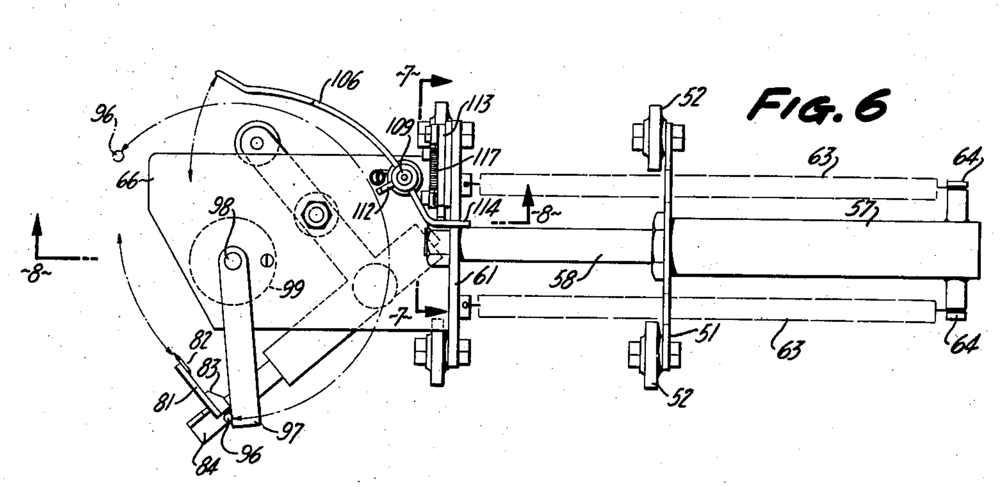
Figure 6 is a plan view of an individual wrapping unit or pocket structure.
Figure 7:
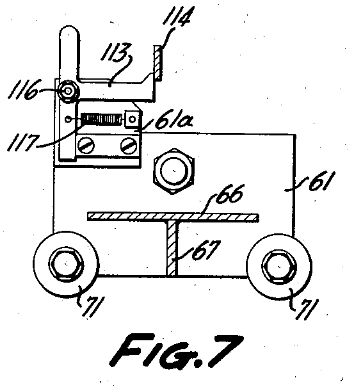
Figure 7 is a vertical sectional view of a part of a wrapping unit taken as indicated by the line 7—7 in Figure 6.

After the strip of wrapping material has been placed around the bunch of broccoli, a strip holding arm is brought into play, and this strip holding arm 106 (Figures 3 and 6) is provided with a vertical strip-engaging end portion 106*a* (Figure 3) and offset downwardly from the upper horizontal portion of the arm 106 at its point of attachment to a collar 107. Collar 107 is secured on an upright supporting sleeve 108 pivotally mounted above a collar 110 on an upright rod 109 secured in stationary fashion on the horizontal support plate 66. A torsion spring 111 is connected between the plate 66 and an arm 112 on the sleeve 108 to urge the strip holding arm 106 counterclockwise as viewed in Figure 6. Such movement of this arm is normally restrained by the engagement of a T-shaped latch 113 (Figure 7) engaging an arm 114 secured to the sleeve 108 (Figures 3 and 6). The latch 113 (Figure 7) is pivoted at 116 on an upper extension of the support plate 61 and is urged to active position by a spring 117 extending between one arm of the T-shaped latch 113 and a support on the extension 61*a* of the support plate 61.

In order to control the release of the latch 113 for the paper strip holding arm 106, a control roller 118 (Figures 3 and 2*b*) is mounted by a bracket 118*a* on the frame in position to engage the upstanding arm of the T-shaped latch 113 at the appropriate time to rock it and release the arm 106 for swinging to active position under control of its spring 111. To effect re-latching of the arm 106, a second roller 119 is carried by a frame bracket 119*a* in position to be engaged by the arm 114 associated with each holding arm 106 and move the arms 106 and 114 to inactive position, the arm 114 being re-engaged by the latch 113.

In order to understand the operation of the various portions of the wrapping pockets in applying the wrap to a bunch of broccoli, the various cooperating units associated therewith will now be described.

*Tape feed unit*

The tape feed unit, as illustrated in Figures 1, 2*a* and 12 through 16, comprises means for forming the tape or strip to the desired configuration, i. e., folding over the edges of the strip to provide a double thickness of material at each edge for re-inforcing purposes and to bring into play at a desired time under control of the successive wrapping pockets a perforating device to provide a point of severance between adjacent wraps for bundles. As shown in Figure 2*a*, the strip of wrapping material 34 is impaled and being driven by the points 82 of the uppermost wrapping unit 28 and is trained about the respective rolls and folding elements of the feeding unit. From the roll 36 of material shown in Figure 1, the strip 34 extends over a flanged idler roll 121 (Figures 2*a* and 14) which is journalled on an upright shaft 122 on the frame plate 123 of the feeding unit. This frame plate 123 is suitably supported on the frame of the machine. From the roll 121 the strip 34 enters a pair of forming rolls 124 and 126, roll 124 having frusto-conical ends at either side of a pair of crimping lips 124*a* which engage with cooperating crimping grooves 126*a* below the frusto-conical ends of the roll 126. The roll 124 is mounted in stationary position on the frame 123 on a suitable journal stud 127 while the roll 126 is carried on a stud 128 supported on a bar 129 which is urged counterclockwise, as viewed in Figure 2*a*, by a spring 131 (Figure 14) to engage the roll 126 with the roll 124.

Figures 15, 16, 21:
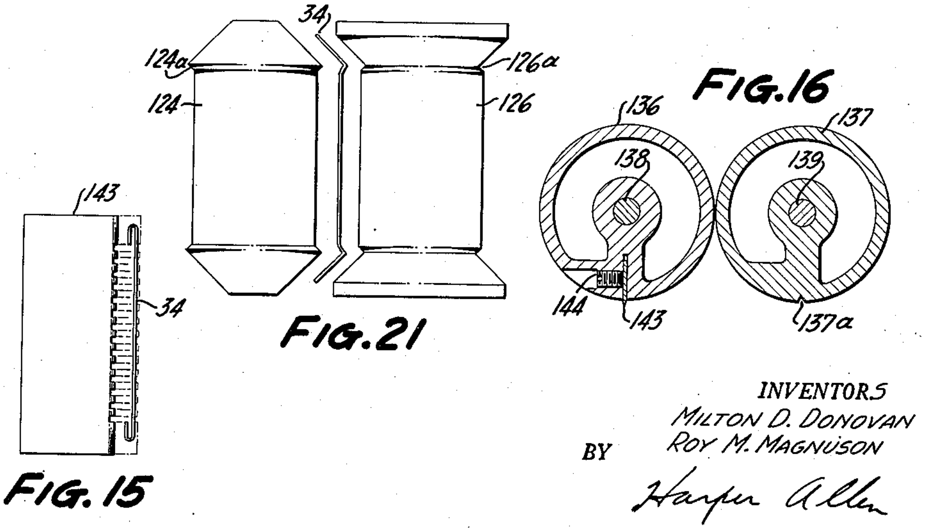
Figure 15 is an enlarged view illustrating the knife construction for perforating the tape.
Figure 16 is a horizontal sectional view taken as indicated by the line 16—16 in Figure 12.
Figure 17:
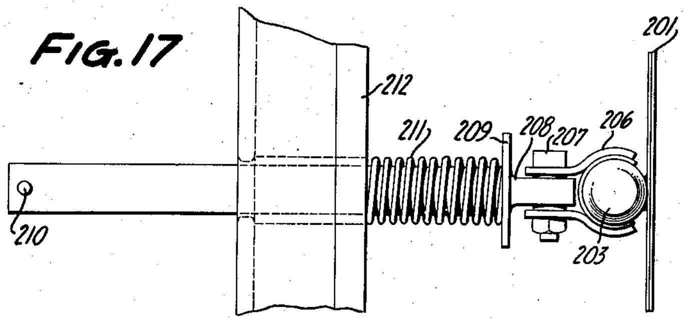
Figure 17 is an enlarged plan view of one of the heater units of the heat sealing element illustrating its mounting.

The strip 34 with its crimped edges leaves the rolls 124 and 126 and engages an edge folding plate 131 mounted on a support 132 and having rolled edges 131*a* which converge toward the discharge end and which serve to complete the folding of the edge portions to narrow the strip and to provide double-thickness reinforcing portions at its edges. From the forming plate 131 the strip 34 with its folded edges passes over an idler roll 133 journalled on an upright shaft 134 and passes into engagement with a pair of perforating rolls 136 and 137. A second idler roll 133 on shaft 154 receives the strip from the rolls 136 and 137. The respective rolls 136 and 137 are secured on respective shafts 138 and 139 (Figure 12) journalled by respective sets of bearings 141 in plate 123 and an upper plate 142 supported on the plate 123. As seen in Figure 16, the roll 137 is notched at 137*a* and the roll 136 carries a perforating knife 143 secured therein by a set screw 144. The knife 143 and its relation to the folded strip 34 is shown in Figure 15, the knife being continuous at its ends to cut through the folded edges of the strip while performing a perforating operation intermediate these folded edges.

Figure 12:
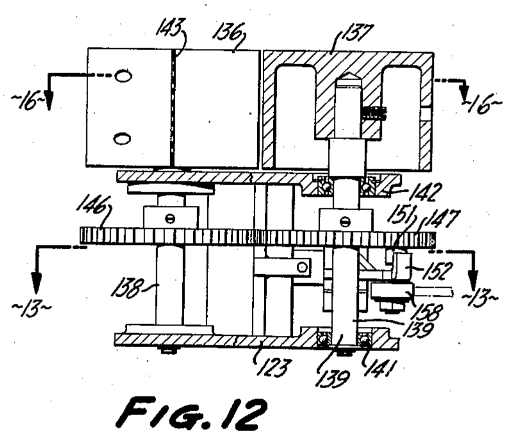
Figure 13:
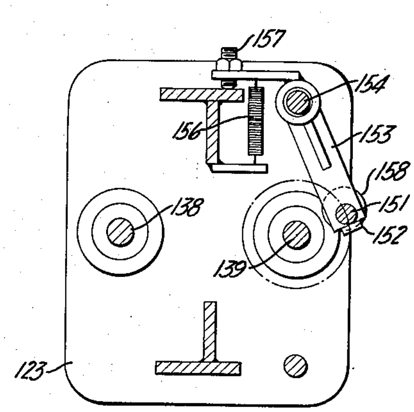
Figure 13 is a horizontal sectional view of the tape feed mechanism taken as indicated by the line 13—13 in Figure 12.
Figure 14:
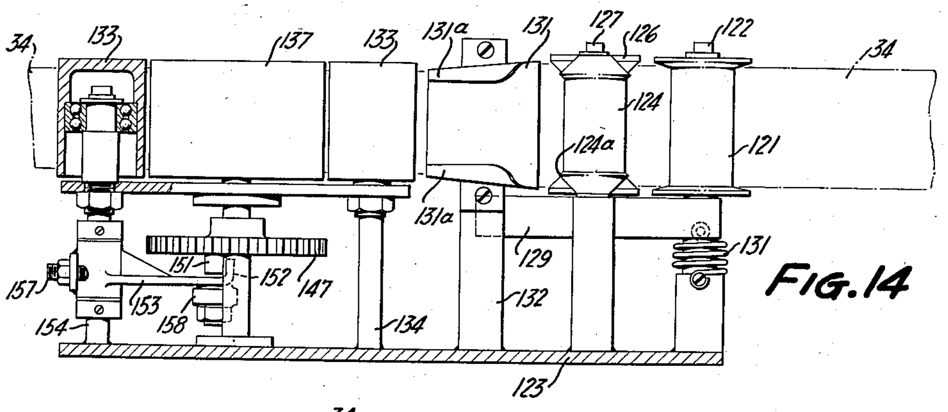

In order to provide time rotation of the rolls 136 and 137, the shafts 138 and 139 carry respective meshing gears 146 and 147 secured thereon. The rotation of these gears and the rolls 136 and 137 is under the control of a clutch arrangement so that normally the tape is sliding between the rolls under the drive of the preceding wrapping pocket until the desired time for perforation of the strip in connection with the next pocket to pick up the tape. The strip 34 being drawn between rolls 136 and 137 tends to turn them in the direction indicated by the arrows in Figure 2*a*, but such action is restrained by the engagement of a stop pin 151 (Figures 12 and 13) carried by the gear 147 with a clutch dog 152 on an arm 153 pivoted at 154 and urged counterclockwise by a spring 156. An adjustable stop screw 157 is provided to control the timing of these parts. The lever 153 carries a control roller 158 (Figures 12 and 13). The roller 158 is positioned in the path of the horizontal plate 66 of a pocket to be engaged thereby and release the rolls 136 and 137 for rotation so that they will turn one revolution, perforate the paper in the center, cut the edges, and again be stopped in the position shown in Figure 2*a* by the stop lever 153 and its lug 152 as shown.

This operation provides for perforating or providing a weakened line of severance between each length of wrapping with respect to each pocket so that there is no possibility of incremental error in the length of wrap increasing from perforation to perforation as would be the case if the rolls 136 and 137 turned continuously, and were not timed in their operation by the pockets themselves.

As seen in Figure 2*a*, the pins 82 of the pocket adjacent the feed unit are approaching the strip 34 to pick up the drive of the strip, and a weakened section or perforation has just been made at 34*a*, the rolls 136 and 137 will continue in rotation until the pin 151 again engages the stop 152 therefor. The pocket 28 at the top of Figure 2*a* is approaching a strip securing and folding station which the leftmost pocket 28 in Figure 2*b* has just passed.

*Strip securing and severing stations*

Figures 9, 11:
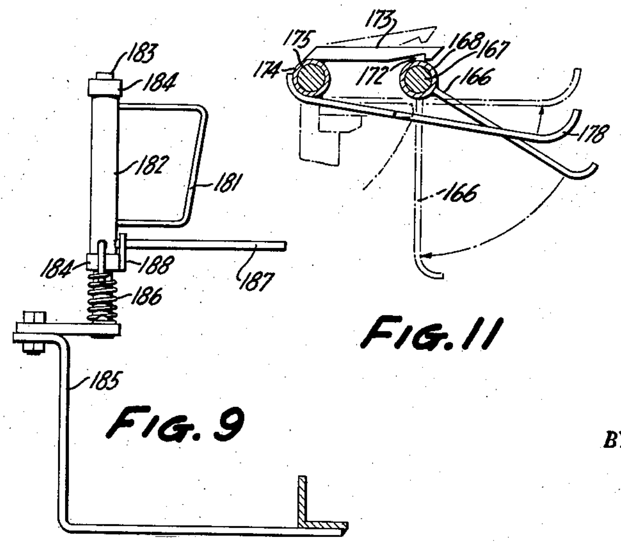
Figure 9 is a fragmentary sectional view taken as indicated by the line 9—9 in Figure 2b.
Figure 11 is a horizontal sectional view taken as indicated by the line 11—11 in Figure 10.
Figure 10:
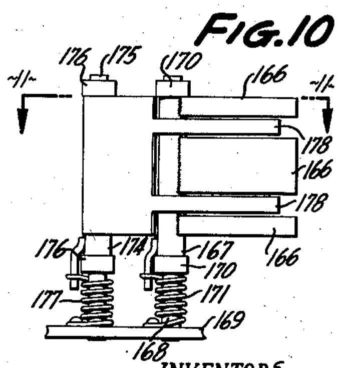
Figure 10 is an elevational view of the means for impaling the paper or wrapping material on each wrapping unit taken generally as indicated by the line 10—10 in Figure 2b.

Referring to Figures 2*b*, 10 and 11, there is provided a set of three strip folding arms 166 on a sleeve 167 journaled on an upright stud 168 on a support bracket 169. Respective collars 170 on the stud 168 serve to locate the sleeve 167 and the arms 166. The sleeve 167 and the folding arms 166 are urged clockwise as viewed in Figure 11 by a torsion spring 171. The sleeve 167 (Figure 11) carries an ear 172 which is engaged by a latch arm 173 carried by a sleeve 174. The sleeve 174 is journaled on an upright shaft stud 175 between collars 176 and is urged clockwise by a spring 177 so that its trip arms 178 lie in the path of the strip support plate 81 of each pocket to be engaged thereby during travel through this station. Upon such engagement the trip arms 178 are rocked to release the latch 173 so that the strip folding arms 166 are rocked clockwise by the spring 171 from their full line to their dotted line positions as shown in Figure 11, to secure the strip 34 on the pins 82. Subsequent travel of this wrapping pocket moves the arms 166 back to their normal position and allows re-engagement of the latch 173 with the ear 172.

Just before this strip securing or impaling operation occurs in connection with one pocket 28, this strip is severed from the preceding strip by means of an impact bail 181 (Figures 2b and 9) carried on a sleeve 182 journaled on an upright stud 183 between collars 184 thereon. The stud 183 is suitably carried by a support bracket 185 on the machine frame. The sleeve 182 is urged clockwise by a spring 186 for engagement of a horizontal arm 187 to a position determined by the engagement of the horizontal arm 187 on the tube 182 with a stop pin 188 carried on the lower collar 184. As a wrapping unit pocket approaches the paper severing unit shown in Figure 2b the horizontal arm 187 is engaged by the support bar 83 of the unit to cock the severing bail 181 which is subsequently released to strike the paper strip 34 immediately rearwardly of or adjacent a perforated section 34a thereof to sever the paper. It will be noted in Figure 9 that the bail is inclined with respect to its support axis to place the upper portion thereof in leading position during impact on the strip. One length of the strip 34 is then carried by a wrapping unit as shown in Figure 2b.

Subsequently, as described in detail in the operation, this strip of paper is wrapped around an associated bunch of broccoli by the bar 96 and is engaged and held in position by the holding or clamping member 106 as shown at the top of Figure 2b, before the paper wrapping unit becomes engaged with the heat sealing and strip tightening means.

*Heat sealing and strip tightening unit*

Figures 18, 19:
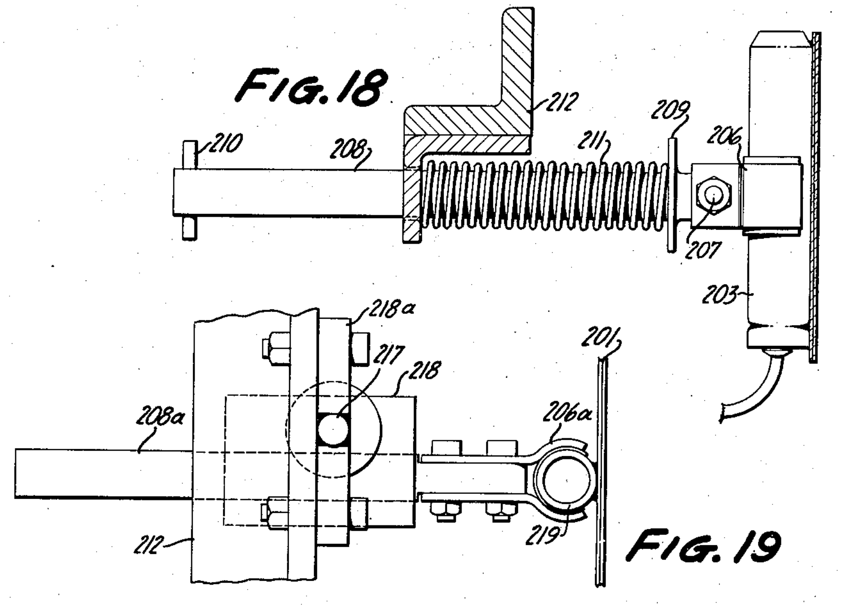
Figure 18 is a vertical sectional view of the heater unit of Figure 17, its relation to the apparatus being shown by the line 18—18 in Figure 2c.
Figure 19 is an enlarged plan view of one of the support elements for the heater strip.
Figure 20:
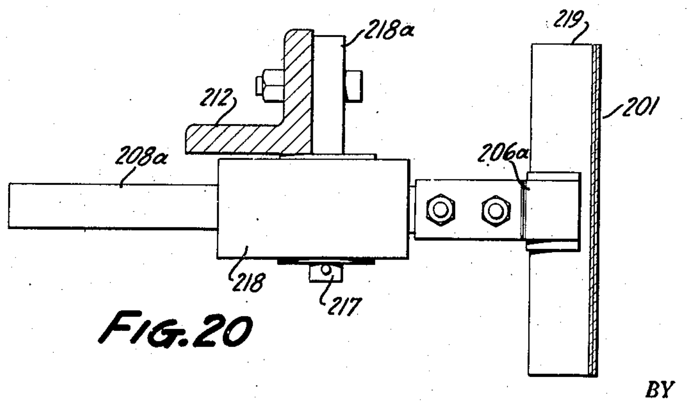
Figure 20 is a vertical sectional view of the support element shown in Figure 19, its relation to the general apparatus being indicated by the line 20—20 in Figure 2c.

This unit comprises a pair of thin flexible metal strips 201 (Figures 2b, 2c, 17 and 18) of suitable heat conducting material such as brass extending between respective floating end brackets 216 (Figure 2b) and 216a (Figure 2c). The strips 201 are in abutting relation and are mounted yieldably on the bunching unit so as to flex in wave fashion as different size bunches travel therealong. The first or left-hand portion of the strips 201 comprise a heating section and has a plurality of tubular electrical heat units 203 of conventional construction secured on the inner strip in vertical position by brazing. Certain of these elements are engaged by yieldable support means in the form of heat-insulated U-clamps 206 held by a pin 207 at the end of a support rod 208. Each support rod 208 is provided with a collar 209 engaged by a spring 211 compressed between the collar and a support member 212 extending along the frame of the bunching machine. A retaining pin 210 (Figure 18) is provided in each support rod 208, and each rod 208 is engaged loosely by the member 212 to allow universal pivoting movement and accommodate limited endwise movement of the heating strips. As seen in Figures 2b and 2c, there are nine heater units 203 along the heating portion of the strips 201 and four such units are mounted on support rods 208. The endmost unit 203 to the right (Figure 2c) is mounted by heat-insulated U-clamps 206a (Figures 19 and 20) secured at the ends of a support rod 208a slidable in a bearing block 213 which is pivoted on a pin 217 secured by welding to plates 218a which are bolted on the frame member 212.

The right-hand portion of the strips 201 provide a cooling section along which a plurality of support tubes 219 are brazed to the inner strip 201 for mounting on supports 208 and 208a in the same fashion as the heater units 203 but without heat insulation.

At the end of the travel of a wrapped bunch along the strips 201, a bar 220 is mounted on the bunching unit and projects into the path of the support bar 83 of the plate 81. Thus the plate 81 and its support members are rocked counterclockwise by the bar 220 (Figure 2c) to withdraw the plate 81 and pins 82 from the sealed wrapping strip. This occurs just as the trailing roller 89 is riding down the end portions 48a of the cam track 48. Subsequently the control roller 77 of the pocket engages a cam track portion 47a of the track 47. An opposed track section 229 carried by plate 229a assists in controlling the roller 77.

*Bunching unit*

As previously stated, the bunching unit as disclosed herein is identical in construction and mode of operation with that disclosed in the copending application of Magnuson and Daugherty referred to above. Briefly referring to Figure 3, each clamping pocket or bunching pocket 21 of the endless series of such devices comprises spring-urged jaw means 222 carried by a support tube 223 for in and out sliding movement on the frame 224 of the bunching unit under the control of a cam track 226 with which a roller 227 engages. A bunch of broccoli 228 indicated as being held by the clamping pocket in Figure 3 will have a spacing with respect to the frame 224 of the bunching unit depending upon the exact size of bunch and depending upon the consequent travel of the clamping means 222 in engaging the bunch. It will be noted that this bunching pocket 21 is in overlying vertically aligned relation with respect to an associated wrapping unit pocket 28 and is travelling along the same path at the same rate of speed.

For further details of construction of the bunching unit and its pocket reference is made to said copending application.

OPERATION

Referring to Figure 1, as previously stated, the broccoli is taken from the circulating conveyor 24 by operators at the station A and is fed to the open bunching pockets 21 which are travelling generally counterclockwise as viewed in Figure 1. Subsequently, these pockets are closed as indicated toward the left portion of their travel to compact the bunches before they are carried through a cut-off or butt trimming saw 26, all as disclosed in said application. After the bunches of broccoli in the pockets 21 travel around the sprocket 22 they enter their coincident path of travel with the pockets 28 of the wrapping unit which travel generally clockwise as viewed in Figure 1.

As the pockets or wrapping devices of the wrapping unit 28 travel past the tape or strip feed mechanism 33, the pins 82 of each wrapping pocket pick up and travel this strip through the perforating means, with the release of the perforating rolls 136 and 137 for travel with the strip being controlled by each pocket as it trips the clutch control lever 153. As a result the perforation of each individual strip or wrap of the entire tape is effected with respect to a particular pocket. It will be noted that as the pockets 28 start their travel around the end of the machine associated with the sprocket 29 they are relatively accelerated in speed so as to be spaced apart a greater extent during such travel. This enables the picking up of the proper length of tape or wrapping strip for each pocket in this region.

It will be noted in Figure 2*a* that the pins 82 of a pocket are only partially impaling the strip 34. Subsequently as the pins 82 and their supporting plate 81 reach the strip impaling and folding station (shown at the left-hand portion of Figure 2*b*), the folding and impaling arms 166 are released as shown in Figure 2*b* to impale the strip 34 completely over the impaling pins so that it can be carried by the wrapping pocket after severing from the continuous tape. This operation also serves to impart a substantially V-shaped fold to the strip over the plate 81. Just prior to this time the paper severing unit also shown in Figure 2*b* has operated to impact the bail 181 against the tape 34 adjacent a perforated portion 34*a* thereof to separate the previous wrapping strip from the continuous tape as shown at the upper left-hand portion of Figure 2*b*. As a result the free end of the strip can be folded back over the plate 81 as described above.

As a result of these operations the second pocket from the left in Figure 2*b*, which is immediately beyond the strip severing station, and the preceding prockets which have travelled past this point have associated therewith a wrapping strip which is securely impaled on the pins 82 of the support plate 81 for travel therewith with the short end of the strip adjacent the outer portion of the plate 81 and the long portion of the strip trailing from the inner portion thereof and overlapping the wrapping rod 96 of this pocket. When the pocket is travelling past the stationary V-belt segment 101, the pulley 99 engages and is rotated by this segment to rotate the shaft 98, the arm 97 and the wrapping rod or element 96 thereon counterclockwise as viewed in the drawings so that it moves from its full line position in Figure 6 to its dotted line position. The movement of the rod 96 carries the strip of material around the bunch of broccoli to place both ends of the strip outermost with respect to the wrapping pocket. Immediately thereafter the strip of the pocket, as shown at the second pocket from the right in Figure 2*b*, is engaged by the holding arm 106 so that the wrapping rod or element 96 can be immediately returned by its spring to its inactive position. This operation positions the ends of the strip for tightening and sealing.

Thereafter the wrapping device and the aligned bunching pocket enter the zone of wrap tightening and heat sealing. The free projecting end of the wrapping strip 34, as shown in the rightmost pocket in Figure 2*b*, engages the inclined feed end of the heating strips 201 and engages with the other end of the strip impaled on the pins 82 so that the two ends of the strip are placed in overlapping relation between the plate 81 and the strips 201.

The first action of these heating strips 201 is a pulling action on the free end of the wrap 34 so that it is pulled tightly around the bunch of broccoli. This action will occur before sufficient heating of the wrap to perform any heat sealing operation. Subsequently, as the support plate 81 of a pocket travels along the heating strips 201 with the overlapped ends of the wrap interposed between it and the heating strips, the ends of the wrap are heated so that a heat seal is performed. The flexible or floating mounting of the strips 201 accommodates them to different sizes of broccoli bunches as shown by the varying sizes of the bunches indicated in Figures 2*b* and 2*c*, and the strips 201 float in wave fashion to accommodate the various sizes.

After the pockets have travelled along the heating zone thereof, the remaining length of the strips 201 serve to extract heat and cool the heat sealed ends of the wrapping to a temperature below that at which separation could occur.

As the pockets leave the strips 201, the rollers 89 controlling the position of the support and heat seal plate 81 leave their controlling track 48, as seen in Figure 2*c*, so that the support plate 81 is rocked counterclockwise as indicated in the drawings to withdraw the plate 81 from engagement with the wrapping strip. As a result the wrapped bunch of broccoli is free to travel on with the pockets of the bunching unit to their point of discharge over the discharge conveyor 25 as shown in Figure 1.

While we have shown and described a preferred embodiment of the invention, it will be apparent that the invention is capable of further variation and modification and its scope should be limited only by the scope of the claims appended hereto.

We claim:

1. In vegetable bunching and wrapping apparatus a bunching conveyor comprising, an endless series of pocket devices for holding bunches of vegetable articles, a wrapping unit including a wrapping conveyor comprising an endless series of wrapping devices having a stretch thereof in overlapping relation with a stretch of the pocket devices, and means for driving said respective series of devices in timed relation so that the overlapped stretches thereof travel at the same speed, and wrapping means carried by each of said wrapping devices for supplying and applying an individual wrap to the bunch in each one of the pocket devices during travel along said overlapped stretches.

2. In vegetable bunching and wrapping apparatus a bunching conveyor comprising, an endless series of pocket devices for holding bunches of vegetable articles, a wrapping unit including a wrapping conveyor comprising an endless series of wrapping devices having a stretch thereof in overlapping relation with a stretch of the pocket devices, and means for driving said respective series of devices in timed relation so that the overlapped stretches thereof travel at the same speed, each wrapping device including a yieldably mounted wrap holding element, and wrapping means carried by each of said wrap holding elements for applying an individual wrap to the bunch in an aligned one of the pocket devices during travel along said overlapped stretches.

3. In vegetable bunching and wrapping apparatus a bunching conveyor comprising, an endless series of pocket devices for holding bunches of vegetable articles, a wrapping unit including a wrapping conveyor comprising an endless series of wrapping devices having a stretch thereof in overlapping relation with a stretch of the pocket devices, means for driving said respective series of devices in timed relation so that the overlapped stretches thereof travel at the same speed, means for supplying a continuous strip of wrapping material to said wrapping devices, and means for severing said strip into individual wraps after pick-up thereof by the wrapping devices.

4. In vegetable bunching and wrapping apparatus, a bunching conveyor comprising, an endless series of pocket devices for holding bunches of vegetable articles, a wrapping unit including a wrapping conveyor comprising an endless series of wrapping devices having a stretch thereof in overlapping relation with a stretch of the pocket devices, means for driving said respective series of devices in timed relation so that the overlapped stretches thereof travel at the same speed, and means for supplying a continuous strip of wrapping material to said wrapping devices including means controlled by each wrapping device for weakening said strip at a desired line of severance for an individual wrap.

5. In vegetable bunching and wrapping apparatus a bunching conveyor comprising, an endless series of pocket devices for holding bunches of vegetable articles, a wrapping unit including a wrapping conveyor comprising an endless series of wrapping devices having a stretch thereof overlapping a stretch of the pocket devices, and means for driving said respective series of devices in timed relation so that the overlapped stretches thereof travel at the same speed, each said wrapping device including a wrap support element having wrap impaling means thereon.

6. In vegetable bunching and wrapping apparatus a bunching conveyor comprising, an endless series of pocket devices for holding bunches of vegetable articles, a wrapping unit including a wrapping conveyor comprising an endless series of wrapping devices having a stretch thereof overlapping a stretch of the pocket devices, and means for driving said respective series of devices in timed relation so that the overlapped stretches thereof travel at the same speed, each said wrapping device including a yieldably mounted wrap support element having wrap impaling means thereon and supported on the associated wrapping device for swinging movement from an inactive position to active position alongside a bunch of vegetables in one of said pocket devices to place the wrap in operative relation with respect thereto.

7. In vegetable bunching and wrapping apparatus a bunching conveyor comprising, an endless series of pocket devices for holding bunches of vegetable articles, a wrapping unit including a wrapping conveyor comprising an endless series of wrapping devices having a stretch thereof overlapping a stretch of the pocket devices, means for driving said respective series of devices in timed relation so that the overlapped stretches thereof travel at the same rate of speed, and wrapping means associated with each of said wrapping devices including means for supporting one end of a wrap adjacent the bunch in the associated pocket device, and means for traversing the wrap around the bunch during travel along said overlapped stretch to place the ends of the wrap in overlapping relation.

8. In vegetable bunching and wrapping apparatus a bunching conveyor comprising, an endless series of pocket devices for holding bunches of vegetable articles, a wrapping unit including a wrapping conveyor comprising an endless series of wrapping devices having a stretch thereof overlapping a stretch of the pocket devices, means for driving said respective series of devices in timed relation so that the overlapped stretches thereof travel at the same rate of speed, wrapping means associated with each of said wrapping devices including means for supporting one end of a wrap adjacent the bunch in the associated pocket device, means for traversing the wrap around the bunch during travel along said overlapped stretch to place the ends of the wrap in overlapping relation, and heat sealing means for engaging said overlapped ends.

9. In vegetable bunching and wrapping apparatus a bunching conveyor comprising, an endless series of pocket devices for holding bunches of vegetable articles, a wrapping unit including a wrapping conveyor comprising an endless series of wrapping devices having a stretch thereof overlapping a stretch of the pocket devices, means for driving said respective series of devices in timed relation so that the overlapped stretches thereof travel at the same rate of speed, wrapping means associated with each of said wrapping devices including means for supporting one end of a wrap adjacent the bunch in the associated pocket device, means for traversing the wrap around the bunch during travel along said overlapped stretch to place the ends of the wrap in overlapping relation, and stationary heat sealing means along said stretch for engaging said overlapped ends to first effect tightening of said wrap and to thereafter effect heat sealing of said overlapped ends.

10. In a vegetable bunching and wrapping apparatus, the combination of a bunching unit comprising a bunching conveyor including an endless series of pocket devices for holding bunches, and a wrapping unit including a wrapping conveyor comprising an endless series of wrapping devices having a stretch thereof in cooperative relation with a stretch of said pocket devices with the respective devices in alignment with each other, each of said devices including means for applying a wrap to the bunch in the associated pocket device, the wrapping devices of said wrapping unit being yieldably mounted to accommodate a slight misalignment of the pocket devices along the path of travel, and a floating heat seal unit extending along a portion of said stretch for securing the wrapping on each one of the bunches passing thereby.

11. In a vegetable bunching and wrapping apparatus, the combination of a bunching unit comprising a bunching conveyor including an endless series of pocket devices for holding bunches, and a wrapping unit including a wrapping conveyor comprising an endless series of wrapping devices having a stretch thereof in cooperative relation with a stretch of said pocket devices with the respective devices in alignment with each other, each of said devices including means for applying a wrap to the bunch in the associated pocket device, the wrapping devices of said wrapping unit being yieldably mounted to accommodate a slight misalignment of the pocket devices along the path of travel.

12. In a vegetable bunching and wrapping apparatus, the combination of a bunching unit comprising a bunching conveyor including an endless series of pocket devices for holding bunches, and a wrapping unit including a wrapping conveyor comprising an endless series of wrapping devices having a stretch thereof in cooperative relation with a stretch of said pocket devices with the respective devices in alignment with each other, each wrapping device including means for holding a strip of wrapping material around a bunch in the associated pocket with the ends thereof in engagement, and heat sealing means extending along a portion of said stretch for engaging said ends to secure the wrapping to each one of the bunches passing thereby.

13. In a vegetable bunching and wrapping apparatus, the combination of a bunching unit comprising a bunching conveyor including an endless series of pocket devices for holding bunches, and a wrapping unit including a wrapping conveyor comprising an endless series of wrapping devices having a stretch thereof in cooperative relation with a stretch of said pocket devices with the respective devices in alignment with each other, each wrapping device including means for holding a strip of wrapping material around a bunch in the associated pocket with the ends thereof in engagement, and heat sealing means extending along a portion of said stretch for slidably engaging said ends to first tighten the wrapping about the bunch and then to secure the wrapping to each one of the bunches passing thereby.

14. In a vegetable bunching and wrapping apparatus, the combination of a bunching unit comprising a bunching conveyor including an endless series of pocket devices for holding bunches, and a wrapping unit including a wrapping conveyor comprising an endless series of wrapping devices having a stretch thereof in cooperative relation with a stretch of said pocket devices with the respective devices in alignment with each other, each wrapping device including means for holding a strip of wrapping material around a bunch in the associated pocket with the ends thereof in engagement, a yieldably mounted flexible strip extending along said stretch, and heating means for a portion of said strip.

15. In a bunching and wrapping apparatus, an endless series of wrapping devices, means for carrying said devices along their path of travel including means for first accelerating and then decelerating each unit along a portion of said path, a wrapping feed mechanism for supplying a strip of wrapping material to the devices with the strip disposed along said portion of the path of said devices for pick-up thereby, each of said devices including a member for picking up and advancing said strip of wrapping material through said feed mechanism, means controlled by each of said devices for indicating the point of cut off of the strip for the desired length to wrap a bunch, and strip severing means disposed adjacent said devices in said path portion, said severing means being operative under control of each of said devices.

16. In a bunching and wrapping apparatus, an endless series of wrapping units, a wrapping feed mechanism for supplying a strip of wrapping material to the devices with the strip disposed along the path of said devices for pick-up thereby, each of said devices including a member for picking up said strip of wrapping material from said feed mechanism, means controlled by each of said devices for weakening said strip of material along a transverse line at the point of cut off of the material for the desired length to wrap a bunch, and means controlled by said devices for impacting said strip of material to separate the strip successively at said weakened transverse lines.

17. In a bunching and wrapping apparatus, an endless series of wrapping devices, a wrapping feed mechanism for supplying a strip of wrapping material disposed along the path of said devices, each of said devices including a member for picking up and advancing said wrapping material through said feed mechanism, and means controlled by each of said devices for indicating the point of cut off of the material for the desired length to wrap a bunch, said feed mechanism including normally inactive perforating means frictionally engaging said wrapping material and means controlled by each of said devices for tripping said perforating means for operation in the correct timed relation to said series of devices.

18. In apparatus for the binding and wrapping of a vegetable such as broccoli or the like, a continuously movable endless conveyor having a plurality of individual wrapping devices, each of said wrapping devices including a pocket for holding a bunch of said vegetable and a wrapping mechanism associated with said pocket, means for supplying a continuous strip of material to be wrapped about successive bunches of said vegetable, means for severing such strip into individual wrappers; each of said wrapping mechanisms having means to pick up the continuous strip of wrapping material as the mechanism is moved past a predetermined location and before the strip is severed, and each of said wrapping mechanisms also having means to wrap the individual severed wrapper about the vegetable bunch in the pocket associated therewith; a second continuously movable endless conveyor having a plurality of pockets adapted to hold bunches of said vegetables and also having a stretch thereof in overlapping relation with a stretch of said first mentioned conveyor; and means for driving said conveyors in timed relationship so that the pockets on the overlapped stretches thereof register and travel at the same speed.

References Cited in the file of this patent

UNITED STATES PATENTS

| Number | Name | Date |
|---|---|---|
| 996,187 | Wilson | June 27, 1911 |
| 1,016,067 | Fisher | Jan. 30, 1912 |
| 1,454,555 | Nielsen | May 8, 1923 |
| 1,464,332 | Pease | Aug. 7, 1923 |
| 1,629,525 | Parsons | May 24, 1927 |
| 1,653,908 | Hunt | Dec. 27, 1927 |
| 1,875,979 | Beutel | Sept. 6, 1932 |
| 1,969,160 | Slusher | Aug. 7, 1934 |
| 1,992,463 | Berger | Feb. 26, 1935 |
| 2,082,408 | Lyons | June 1, 1937 |
| 2,090,559 | Strauss | Aug. 17, 1937 |
| 2,109,505 | Rue | Mar. 1, 1938 |
| 2,110,815 | Parsons | Mar. 8, 1938 |
| 2,113,239 | Petskeyes | Apr. 5, 1938 |
| 2,119,670 | Fitz Gerald | June 7, 1938 |
| 2,162,472 | Scharf | June 13, 1939 |
| 2,180,349 | DeBack | Nov. 21, 1939 |
| 2,195,222 | Neumair | Mar. 26, 1940 |
| 2,219,809 | Davis | Oct. 29, 1940 |
| 2,262,991 | D'Arrigo | Nov. 18, 1941 |
| 2,342,584 | Hoppe | Feb. 22, 1944 |
| 2,383,664 | Malhoit | Aug. 28, 1945 |
| 2,397,190 | Malhoit | Mar. 26, 1946 |
| 2,486,892 | Sumida | Nov. 1, 1949 |